United States Patent
Li et al.

(10) Patent No.: US 6,778,588 B2
(45) Date of Patent: Aug. 17, 2004

(54) METHOD FOR CELL INITIAL SEARCH IN A CDMA MOBILE COMMUNICATION SYSTEM

(75) Inventors: Feng Li, Beijing (CN); Tiezhu Xu, Beijing (CN); Yusong He, Beijing (CN); Xiaolong Ran, Beijing (CN)

(73) Assignee: China Academy of Telecommunications Technology, Beijing (CN)

( * ) Notice: Subject to any disclaimer, the term of this patent is extended or adjusted under 35 U.S.C. 154(b) by 150 days.

(21) Appl. No.: 10/255,334

(22) Filed: Sep. 25, 2002

(65) Prior Publication Data

US 2003/0031238 A1 Feb. 13, 2003

Related U.S. Application Data

(63) Continuation of application No. PCT/CN01/00018, filed on Jan. 12, 2001.

(30) Foreign Application Priority Data

Mar. 27, 2000 (CN) ........................................ 00103548 A

(51) Int. Cl.$^7$ ................................................ H04B 1/69
(52) U.S. Cl. ...................................................... 375/130
(58) Field of Search ................................. 375/130, 142, 375/145, 147, 149, 150, 326; 455/422, 456, 12.1, 67.4; 370/342, 331, 320, 335

(56) References Cited

U.S. PATENT DOCUMENTS 5,910,948 A  *  6/1999  Shou et al. .................. 370/335
6,356,763 B1  *  3/2002  Kangas et al. ........... 455/456.1

FOREIGN PATENT DOCUMENTS

| EP | 0852430 A2 | 7/1998 |
| EP | 0924868 A1 | 6/1999 |
| WO | WO 02/098094 | * 12/2002 |
| WO | WO 03/047117 | * 6/2003 |

OTHER PUBLICATIONS

International Search Report corresponding to International Application No. PCT/CN01/00018 dated Apr. 26, 2001.

* cited by examiner

Primary Examiner—Khai Tran
(74) Attorney, Agent, or Firm—Alston & Bird LLP

(57) ABSTRACT

The invention relates to a cell initial search method for user equipment (UE) in a CDMA digital cellular mobile communication system. The method includes: a UE after selecting a working frequency point, obtains downlink synchronization with the base station; and corrects carrier deviation between the UE and the base station. The downlink synchronization includes: deciding a range of downlink training sequence timeslot (DwPTS) based on training sequence power characteristic window value method; solving correlation of received data and training sequence in the range to obtain accurate receiving position of a UE. The correction of carrier deviation between a UE and the base station includes: estimating carrier deviation between a UE and the base station by software, recovering carrier frequency difference by using decision and feedback method to adjust hardware and carrier deviation correction method based on joint detection to correct carrier deviation.

19 Claims, 4 Drawing Sheets

METHOD FOR CELL INITIAL SEARCH IN A CDMA MOBILE COMMUNICATION SYSTEM

CROSS-REFERENCE TO RELATED APPLICATIONS

This is a continuation application of PCT/CN01/00018, filed Jan. 12, 2001, which is incorporated herein by reference in its entirety. The present application also claims the benefit of Chinese Patent Application No. 00103548.7, filed Mar. 27, 2000.

FIELD OF THE INVENTION

The present invention generally relates to mobile communications technology, and more particularly to a cell initial search method of user equipment (UE) in a CDMA digital cellular mobile communications system with a training sequence (pilot).

BACKGROUND OF THE INVENTION

In a digital cellular mobile communication system, after a UE is turned on, a cell initial search is made first. The purposes of the cell initial search are to select a suitable working frequency and to obtain downlink synchronization between the UE and a base station at this working frequency. Only in this way can the UE correctly receive a message sent by the base station.

Additionally, in a real digital cellular mobile communication system, the main clock in the UE and the main clock in the base station are completely independent. Even if both are working at the same working frequency, there is a carrier deviation (also called frequency difference or frequency deviation) between them. During demodulation, if the UE cannot implement relatively accurate carrier deviation recovery (or said calibration, correction), then there will be a carrier component remaining in the baseband signal, this will affect the processing of the baseband signal, further causing code error and make the UE unable to correctly receive information sent by a base station.

Therefore, for a digital cellular mobile communication system, a UE must perform the following work during the cell initial search: lock-in a working frequency, obtain downlink synchronization with the base station at the locked working frequency, and correct carrier frequency deviation.

Naturally, during a real cell initial search, because the independent main clocks of a base station and UE drift along with time, carrier frequency deviation also must also be traced at the same time.

In a real CDMA cellular mobile communication system, a pilot channel generally performs the downlink synchronization. The conventional implementation of a downlink synchronization is: first, locking-in at a working frequency, solving the correlation between the whole data frame received and a preset pilot sequence (training sequence), and then continuously sliding the working frequency for solving the correlation until the correlation peak is greater than a preset threshold. The downlink synchronization is then performed at this working frequency. The working frequency where the correlation peak is located is the UE receiving position.

In any CDMA cellular mobile communication system, a correlation operation is needed for synchronization. Nevertheless, the conventional correlation operation has the following limitation: as the correlation operation is slid at each chip or even fractional chip level of the whole data frame, the operation volume is huge and a long calculation time is required. Besides, as the correlation operation is taken for the whole data frame, it increases the probability of an error decision, especially, in the Time Division Duplex CDMA (TDD-CMDA) system. In a TDD-CDMA system, suppose, for example, near UE "A" there is another UE "B" in conversation. As the distance between UE "A" and UE "B" is short, UE "A" receives a more powerful signal from UE "B" than the signal power sent by the base station. This leads to a mistaken decision about the correlation peak position that is not the real receiving position of the UE, and produces mistaken downlink synchronization information.

In general, carrier frequency deviation is corrected at a digital demodulator (for general situations, a certain degree of carrier deviation will not affect downlink synchronization, but will affect the demodulated information). An analog phase-locked circuit, which is mature technology and well known in the art, is conventionally used. Disadvantages of this solution are: it is difficult to take account of performance and capture bandwidth at the same time, it is sensitive to carrier jitter and it is a complex hardware circuit.

In the China Patent CN 97115151.2 named "A Method And Device For Carrier Recovery And Compensation In A Frequency Spread Communication System," a digital correction method for carrier frequency deviation has been proposed. Nevertheless, the method makes an optimal estimation under a channel model without noise and multipath interference, and is not suitable for a cellular mobile communication system.

SUMMARY OF THE INVENTION

The purpose of the invention is to provide a cell initial search method for a CDMA digital mobile communication system. The method improves the conventional cell initial search method, i.e. proposes a solution for downlink synchronization and carrier deviation correction during cell initial search. With this solution the UE can rapidly and accurately perform downlink synchronization with a base station and has a better effect for carrier deviation correction.

An implementation of the invention can be as follows:

A cell initial search method for a digital mobile communication system with CDMA is used for user equipment so that such user equipment may correctly receive information sent by a base station. The method is characterized in that the user equipment selects a working frequency, and obtains downlink synchronization with the base station at the working frequency, comprising:

a. based on a power characteristic window value method of training sequence, a range of downlink training sequence timeslot is decided first;

b. in the range, by calculating correlation of received data and training sequence, an accurate receiving position of the user equipment is obtained.

The said "based on a power characteristic window value method of training sequence," comprises:

a. in a base station frame structure, increasing the transmitting power of synchronization symbols in the downlink pilot sequence timeslot (DwPTS), and making no transmitting power on protected symbols located before and after the synchronization symbols in the DwPTS;

b. when receiving, user equipment first searches the power characteristic window values of the DwPTS; after a position range of the synchronization symbols has been discovered the correlation operation is only made near the position.

The said "searching the power characteristic window values of the DwPTS to discover a position range of the synchronization symbols," includes:

UE locking-in at a working frequency, then receiving a data frame; calculating each synchronization symbols' power in the DwPTS; calculating power characteristic window values at each synchronization symbols' position; calculating an average power characteristic window value for the whole data frame; searching for a minimum value of the power characteristic window values at all synchronization symbols position of the whole data frame received; deciding whether the ratio of average power characteristic window value and minimum power characteristic window value is greater than a threshold value, and, if it is, then the position of the minimum power characteristic window value is the beginning position of the DwPTS; solving correlation near the beginning position to obtain an accurate receiving beginning point and end the downlink synchronization.

The said "calculate each synchronization symbol power," is to assume that the receiving moment is a synchronization symbol beginning point, then adding the powers of all chips belonging to the symbol to obtain the power of each synchronization symbol.

The said "calculate power characteristic window value at each synchronization symbol position," is for the whole data frame received, calculating each position power characteristic window value R(i) with symbol level sliding at each position with the following formula:

$$R_i = \left( \sum_{k=i}^{i+N-1} P(k) + \sum_{k=i+N+M}^{i+2N+M-1} P(k) \right) \bigg/ \sum_{k=i+N}^{i+N+M-1} P(k)$$

wherein i represents a real receiving position, P(k) represents power value of each symbol, N and M are characteristic window parameters.

The said "calculate power characteristic window value at each synchronization symbol position," is, calculating the power characteristic window value at each position based on each chip power with chip level sliding.

Another implementation of the invention can be as follow:

A cell initial search method for a digital mobile communication system with CDMA is used for a user equipment so that such user equipment may correctly receive information sent by a base station. The method is characterized in that the user equipment traces carrier deviation between the user equipment and the base station, and corrects the carrier deviation in a digital demodulator, comprising:

a. the carrier deviation is estimated by software, and hardware is adjusted by a decision and feedback method;

b. the multipath and multiple access interference is suppressed based on a joint detection method for carrier deviation correction, and the carrier deviation is corrected to a range required by baseband demodulation.

The said Step a includes: estimating carrier deviation of each data frame by software, calculating an adjustment value for the hardware, and adjusting automatic frequency control hardware in the digital demodulator with the calculated adjustment value.

The following formula is used to estimate frequency differences of each data frame by software:

$$Ae^{-jk\alpha} \frac{1}{L} \sum_L [I(i) + jQ(i)]^* [I(i+K) + jQ(i+K)]^*,$$

wherein α represents an estimated frequency difference, I and Q are orthogonal demodulation signals, and L is a statistic length.

The following formula is used to calculate a hardware adjustment value, i.e. for calculating adjustment value of a carrier frequency difference:

$$fa(n) = fe(n) * coef_k(n),$$

wherein fe(n) is the estimated frequency difference for the $n^{th}$ data frame received, the range of adjustment coefficient $coef_k$ is between 0~1, and when k is greater, select a smaller $coef_k$.

The said "multipath and multiple access interference is suppressed based on joint detection method for carrier deviation correction, and the carrier deviation is corrected to a range required by baseband demodulation," includes: a training sequence midamble of data burst inserted into each frame; the user equipment suppresses multipath and multiple access interference with joint detection technology, and symbols near the training sequence midamble are demodulated; with carrier frequency difference information included in these symbols, automatic frequency control hardware is adjusted.

The said "suppress multipath and multiple access interference with joint detection technology, and symbols near the training sequence midamble is demodulated," further includes: demodulating data with the joint detection technology and obtaining P characters before and after the training sequence midamble, and recorded as X(1) . . . X(P) and Y(1) . . . Y(P), respectively; calculating Xi(n)=X(n)/Xj(n), Yi(n)=Y(n)/Yj(n), wherein Xj(n)=Yj(n)=±π/4, ±3π/4; obtaining carrier frequency difference direction by the formula:

$$Z = \sum_{n=1}^{P} Yi(n) / Xi(n);$$

setting an adjustment step length based on the calculated carrier frequency difference direction; adjusting automatic frequency control hardware with the adjustment step length and the obtained frequency difference direction.

Another implementation of the invention also can be as follows:

A cell initial search method for a digital mobile communication system with CDMA comprises: a user equipment selects a working frequency point and obtains downlink synchronization with a base station at the working frequency; the user equipment traces carrier deviation between the user equipment and the base station, and corrects the carrier deviation in a digital demodulator.

Wherein the said "obtains downlink synchronization with a base station," comprises:

a. based on a power characteristic window value method of training sequence, a range of downlink training sequence timeslot is decided first;

b. in the range by calculating correlation of received data and training sequence, an accurate receiving position of the user equipment is obtained.

The said "correct the carrier deviation between the user equipment and the base station in a digital demodulator," comprises:

a. the carrier deviation is estimated by software, and hardware is adjusted by a decision and feedback method;

b. the multipath and multiple access interference is suppressed based on joint detection method for carrier deviation correction, and the carrier deviation is corrected to a range required by baseband demodulation.

The said "based on a power characteristic window value method of training sequence," comprises:

a. in the base station frame structure, increasing transmitting power of synchronization symbols in the downlink pilot timeslot (DwPTS), and making no transmitting power on protected symbols located before and after the synchronization symbols in the DwPTS;

b. when receiving, user equipment first searches the power characteristic window values of the DwPTS, and after the position range of the synchronization symbols has been discovered, the correlation operation is made only near the position.

The invention is a cell initial search method for a CDMA mobile communication system, and is a downlink synchronization method for a CDMA mobile communication system. The method implements locking a working frequency point during a cell initial search, obtaining downlink synchronization with the base station and recovering carrier frequency difference between the base station and user equipment. The method of locking a working frequency point and obtaining downlink synchronization with the base station is: first, deciding a rough range of the training sequence by using a power characteristic window value method based on the training sequence, then solving correlation of a data frame received and the training sequence to obtain the accurate receiving position and to complete a downlink synchronization with the base station. The method of recovering carrier frequency difference between the base station and user equipment is a carrier frequency difference correction method based on joint detection technology. Implementing several steps of the two methods above (or any one of them) will implement a cell initial search of the invention and user equipment completes downlink synchronization rapidly and accurately.

The method of the invention is a cell initial search method mainly directed toward a mobile communication system with training sequence.

DETAILED DESCRIPTION OF THE PREFERRED EMBODIMENTS

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Figure 1:
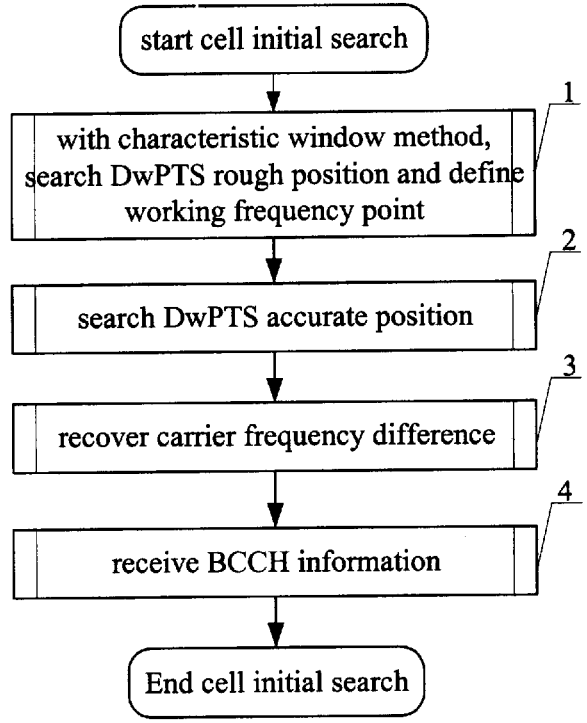
FIG. 1 is a an exemplary diagram of cell initial search in an embodiment of the present invention.

Exemplary FIG. 1 shows basic steps of a cell initial search procedure from starting to ending in a cellular mobile communication system, by taking a Time Division-Synchronized Code Division Multiple Access (TD-SCDMA) system as an example. Step 1 searches a rough position range of DwPTS by using the power characteristic window value method of an embodiment of the present invention, and defines the working frequency point. Step 2 searches for an accurate receiving position by using a conventional solving correlation method in the position range defined by Step 1, and obtains accurate receiving position. Step 3 starts to recover carrier frequency difference based on the joint detection method of carrier frequency difference correction used in an embodiment of the present invention. In Step 4, information in the broadcast channel (BCCH) can be monitored.

Figure 2:
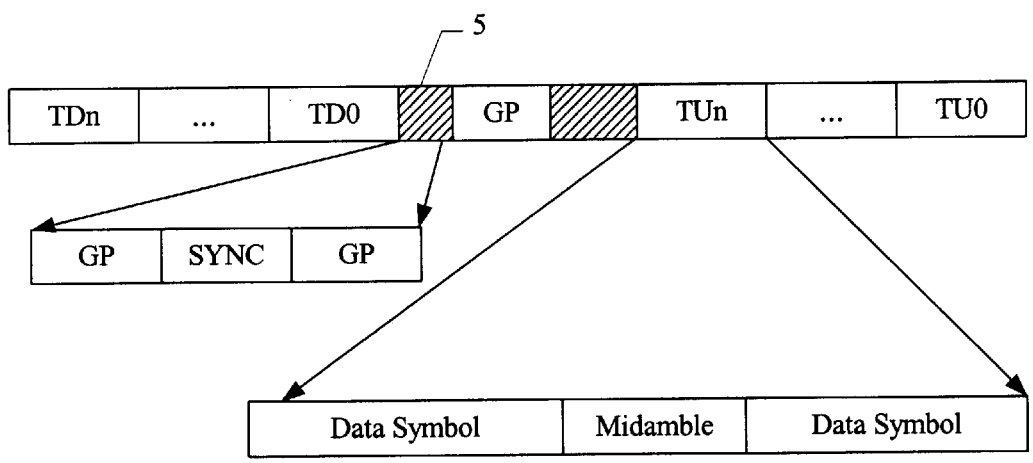
FIG. 2 is an exemplary frame structure diagram required when using the power characteristic window value method in an embodiment of the present invention.

Exemplary FIG. 2 shows a frame structure required when using the power characteristic window value method for implementing downlink synchronization. In an embodiment of the present invention, two training sequences are defined in a frame structure of TD-SCDMA system: an independent DwPTS 5 and a midamble in burst data TD0 . . . TDn, TU0 . . . Tun. The two training sequences have different functions during a cell initial search. The DwPTS 5 occupies an independent timeslot including N GP (guard) symbols, M SYNC (synchronization) symbols and again N GP symbols. Before and after the midamble, there are P data symbols, respectively, and the two data symbols and the midamble together occupy a timeslot. The SYNC symbol is a code selected from a set of orthogonal codes. The code can be obtained by solving correlation, but the operation must be made over whole data frame and the set of orthogonal codes, so the operation volume is very large.

In the downlink synchronization method of an embodiment of the present invention, let the base station raise the transmitting power of SYNC symbols but make no transmitting power at GP symbols. In this way, when receiving, user equipment can first search the power characteristic window value of the DwPTS and discover a rough position range of the SYNC symbols, then solve correlation only near the position range. Therefore, the downlink synchronization time will be greatly shrunk and probability of decision error will be decreased.

Figure 3:
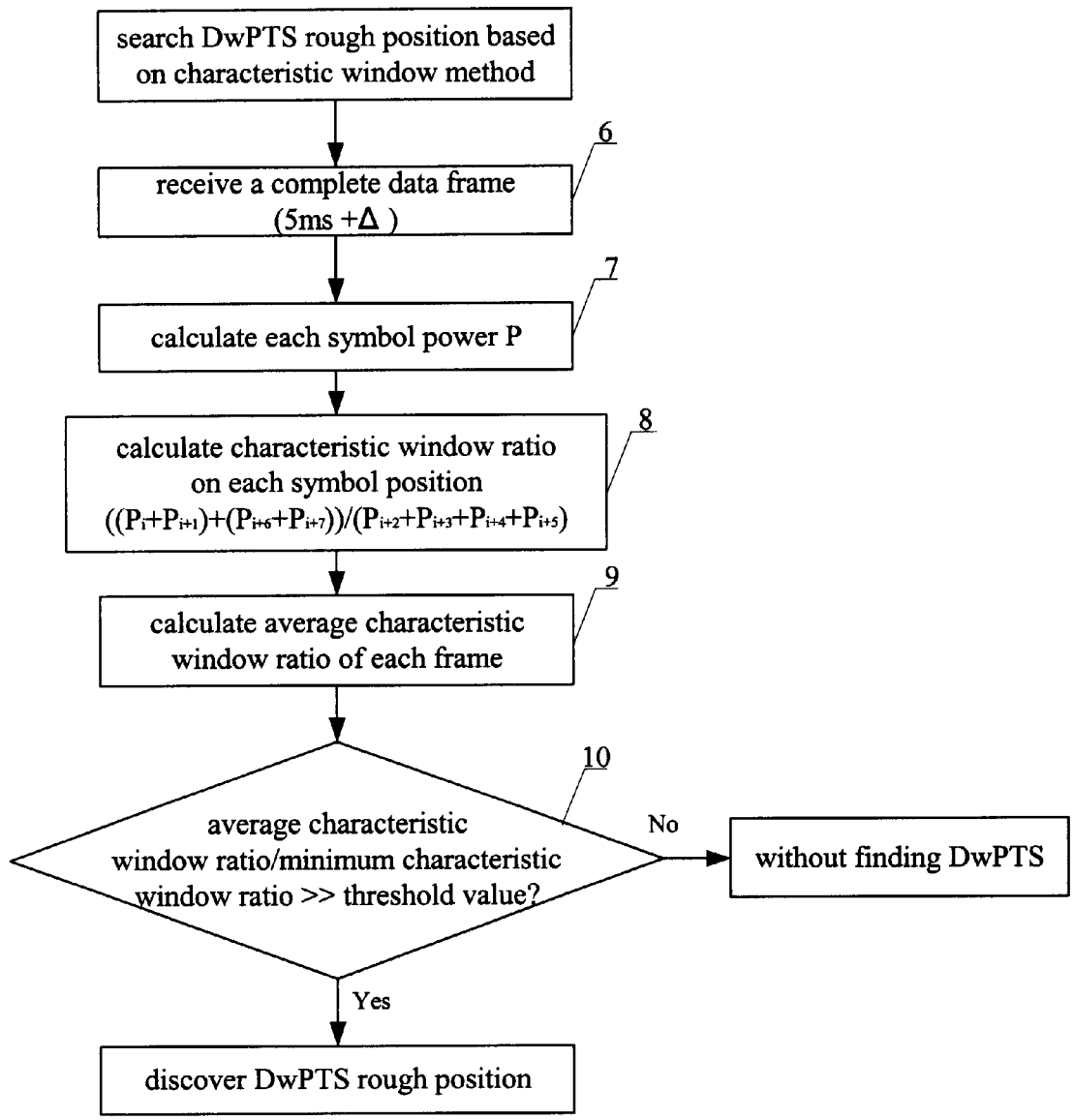
FIG. 3 is an exemplary flowchart implementing the power characteristic window value method in an embodiment of the present invention.

FIG. 3 shows a procedure for searching for a rough position range of DwPTS. Taking a TD-SCDMA system as an example, the procedure starts searching with the characteristic window method and ends with discovering the rough position range of DwPTS or without finding the rough position range of DwPTS. In the TD-SCDMA system, for example, set the number of guard symbols N=2, number of SYNC symbols M=4 and each data frame time length is 5 ms.

In Step 6, the user equipment is first locked-in at a working frequency point, which should be a possible frequency point of a mobile communication system, and then the user equipment receives a complete data frame (e.g. 5 ms+Δ ms). In Step 7, calculate each symbol power P, i.e. first suppose that the receiving moment is the starting point of a symbol, then add power of all chips belong to the symbol to obtain the symbol power. Although, in reality the receiving moment cannot be just the starting point of a symbol, but the purpose of using a power characteristic window value method is to obtain a rough position range of a SYNC symbol. Therefore, there is not much affect as to the result.

In the following formula (1), $R_i$ is the power characteristic window value for each position, i represents the real receiving position, P(k) represents each symbol power, M and N are parameters of the characteristic window shape.

$$R_i = \left( \sum_{k=i}^{i+N-1} P(k) + \sum_{k=i+N+M}^{i+2N+M-1} P(k) \right) / \sum_{k=i+N}^{i+N+M-1} P(k) \quad (1)$$

In Step 8, the power characteristic window value (ratio) on each symbol position is calculated. For example, a receiving data frame sliding in symbol level and on each position taking the TD-SCDMA frame structure N=2, M=4, the power characteristic window value is calculated with the formula $$((P_i+P_{i+1})+(P_{i+6}+P_{i+7}))/(P_{i+2}+P_{i+3}+P_{i+4}+P_{i+5}).$$

Practically, it need not take each symbol power, but take each chip's power. Sliding in chip levels can obtain more accurate results, but it causes a larger operation volume.

In Step 9, calculate the average power characteristic window value (ratio) on a frame: Raver, with the formula:

$$Raver = \sum_{i=1}^{Q} R(i),$$

Wherein R(i) is a power characteristic window value for each receiving position and Q represents the number of receiving positions for a frame.

In Step 10, search for and select the minimum power characteristic window value in a receiving data frame: Rmin, Rmin=min(R(i)); and calculate Raver/Rmin, i.e. average power characteristic window value/ minimum power characteristic window value, to see whether Raver/Rmin is much more greater than a threshold value. If Raver/Rmin is not greater than the threshold, then the DwPTS has not been found. If Raver/Rmin is greater than the threshold, then the position of the minimum value of power characteristic window is the DwPTS starting position. Then, solve the correlation near the obtained starting position of the DwPTS to obtain an accurate receiving starting point and perform downlink synchronization.

Figure 4:
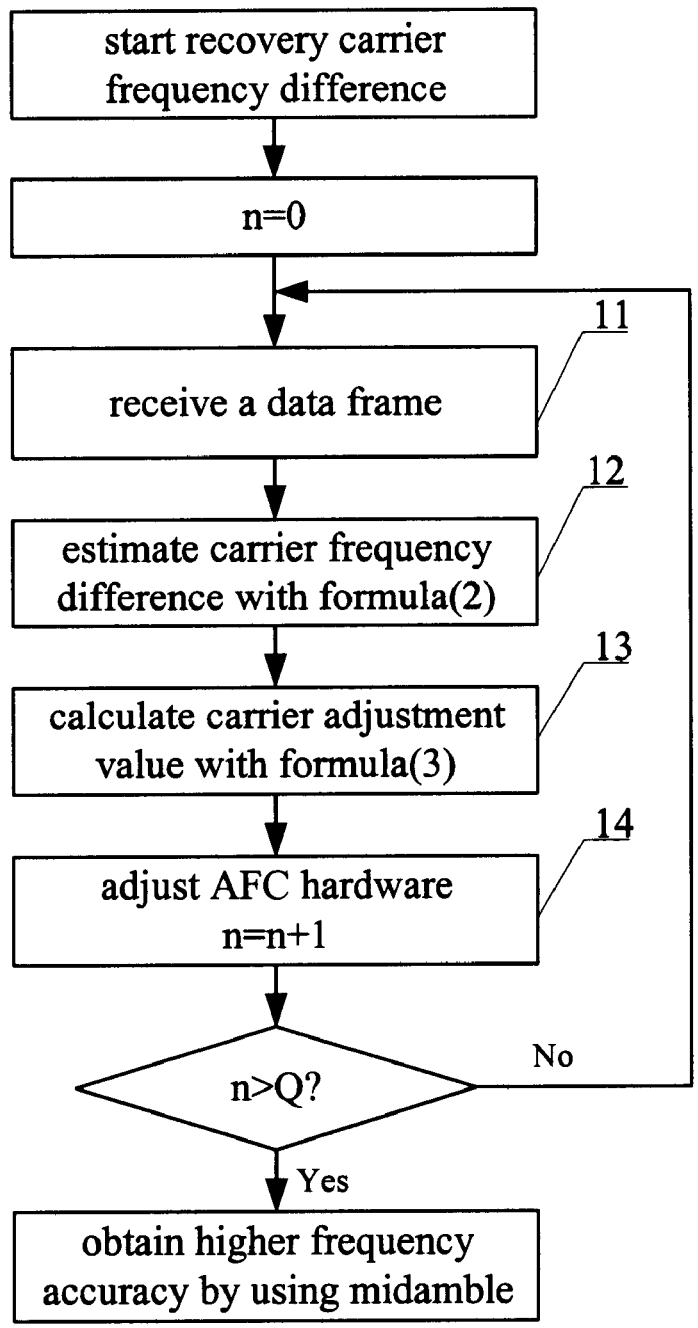
FIG. 4 is an exemplary flowchart for correcting an initial larger frequency difference range to a smaller frequency difference range in the correction of carrier frequency difference in an embodiment of the present invention.
Figure 5:
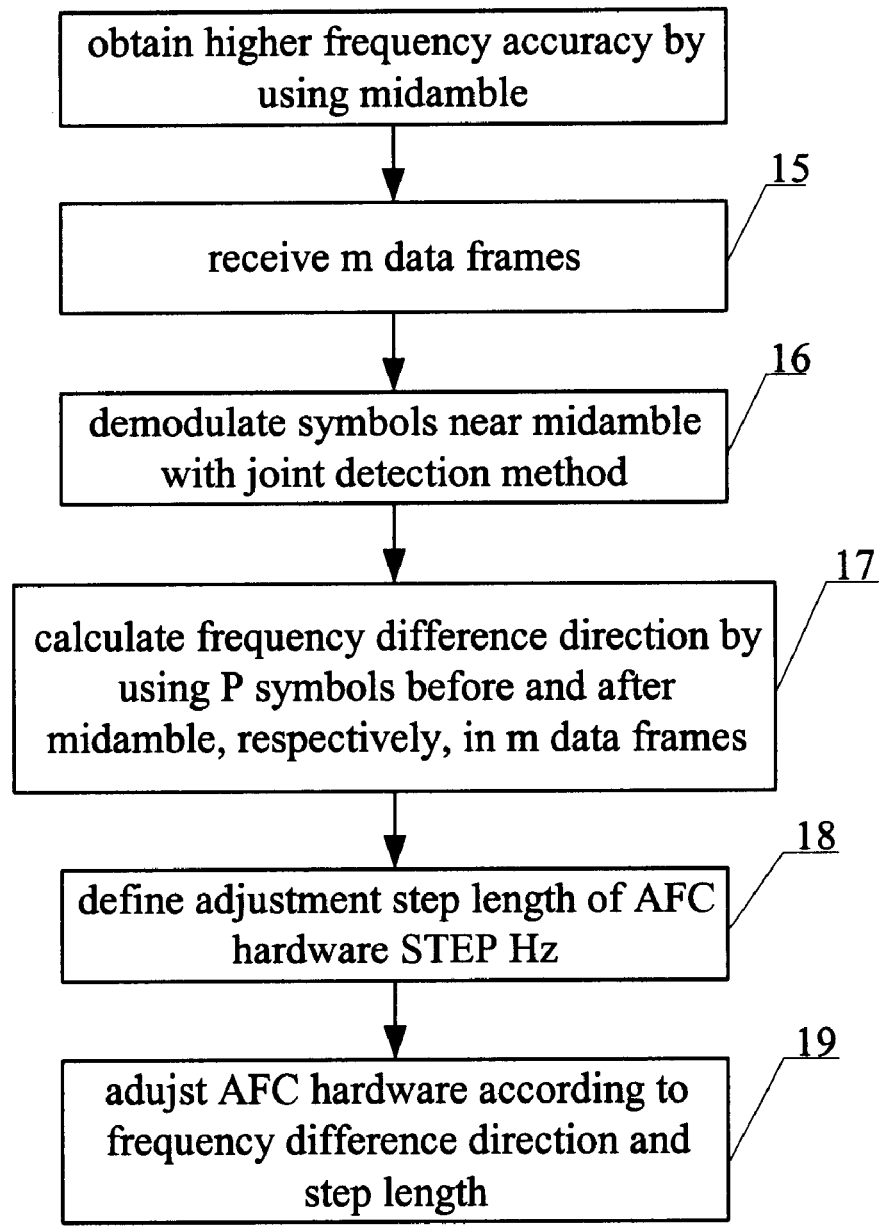
FIG. 5 is an exemplary flowchart for correcting frequency difference to a range required by baseband demodulation in the correction of carrier frequency difference in an embodiment of the present invention.

In an embodiment of the present invention, correcting carrier deviation is implemented by two big steps, which are shown in FIG. 4 and FIG. 5, respectively. In FIG. 4, the first big step, a frequency difference is estimated by software and a decision and feedback mechanism for hardware adjustment is introduced. In the first big step, frequency difference is recovered from an initial larger value to a smaller range; for example, when using a crystal oscillator with accuracy 3 ppm and working frequency range about 2G, the initial value can be considered as about 6 kHz. In FIG. 5, the second big step, mainly by using joint detection technology to suppress multipath and multiple access interference, the smaller frequency difference (for example, about 1 kHz) will be corrected to a range required by baseband demodulation in order to obtain a more accurate frequency difference information for guiding hardware adjustment.

FIG. 4 is an uninterrupted procedure starting from recovering carrier frequency difference until higher frequency accuracy is obtained by using midamble. During this procedure, the frequency difference is estimated by software and the automatic frequency control (AFC) is made for hardware by a decision and feedback mechanism. The procedure corrects frequency difference from an initial larger value to a smaller range.

Estimating frequency difference by software is also a software compensation process. If using only the software compensation without adjusting for hardware, the estimation must be accurate each time. In addition, under a wireless channel the software estimation method is not an estimation without tolerance. Therefore, with only software compensation, the effect is not good enough. On the other hand, although under wireless channel the software estimation is not very accurate, the estimated frequency difference direction is reliable, especially in an average of multiple frames. Therefore, the software estimation can be used to guide the AFC hardware adjustment, to satisfy the requirement of the first big step. The specific steps are as follows:

Before Step 11, set the frame number n=0, and then Step 11 receives a data frame.

Step 12, estimate the frequency difference of each data frame by software with the formula (2):

$$Ae^{-j k \alpha} \frac{1}{L} \sum_L ([I(i) + jQ(i)])^* [I(i+K) + jQ(i+K)]^* \quad (2)$$

Wherein α represents an estimated frequency difference, I and Q are orthogonal demodulation signal, L is a statistic length.

Step 13, with formula (3), calculate the adjustment value of carrier frequency difference, i.e. hardware adjustment value:

$$fa(n)=fe(n)^*\text{coef}_k(n) \quad (3)$$

Wherein fe(n) is an estimated frequency difference, i.e. α for the $n^{th}$ data frame received; adjustment coefficient $\text{coef}_k$ ranges between 0~1, the selection principle is that greater k takes smaller $\text{coef}_k$. For example, a received data frame can be divided into k1, k2, . . . , kn sections; when there are k1<k2< . . . <kn, take $\text{coef}_{k1}$>$\text{coef}_{k2}$> . . . > $\text{coef}_{kn}$.

Step 14, adjust the hardware AFC control according to the calculated hardware adjustment value, do n=n+1, decide whether n>Q? When n is not greater than Q (Q is a preset number of adjustment frames), repeat steps 11 to 14 until n>Q, then end the first big step and go to using midamble for higher frequency accuracy.

In practice, it also can be feedback without each data frame, but with multiple frames. The feedback in this case is inter-adjusting between software and hardware, i.e. first calculate the frequency difference with software, then adjust the hardware guided by the calculated frequency difference; after the hardware has been adjusted, software estimates the frequency difference again; repeat the procedure for a preset number of times.

FIG. 5 shows a procedure that deploys midamble to obtain higher frequency accuracy. Based on joint detection, a smaller frequency deviation is corrected into a range, which can be borne by the baseband demodulation. In a TD-SCDMA system, using joint detection technology means inserting a training sequence (midamble) to each frame for estimating real channel response. In this way, user equipment can suppress multipath and multiple access interference with joint detection technology, demodulate data symbols near the training sequence midamble, and guide adjustment of AFC by using frequency deviation information involved in these symbols. Specific steps are as follows:

Step 15, receive m data frames.

Step 16, demodulate the m data frames with joint detection technology, i.e. demodulate data symbols near the training sequence midamble and obtain P symbols before and after the training sequence midamble, respectively, which can be named as X(1) . . . X(P) and Y(1) . . . Y(P), respectively.

Step 17, calculate, respectively, the frequency deviation direction by using formula (4) on the P symbols before and after the training sequence midamble of the m data frames:

$$Xi(n)=X(n)/Xj(n)$$
$$Yi(n)=Y(n)/Yj(n) \quad (4)$$

Wherein $Xj(n)=Yj(n)=\pm \pi/4, \pm 3\pi/4$;

Then use formula (5) to obtain a carrier frequency difference:

$$Z = \sum_{n=1}^{P} Yi(n)/Xi(n). \quad (5)$$

Step 18, set the adjustment step length (STEP Hz) of the AFC hardware according to the calculated frequency difference direction.

Step 19, according to the frequency difference direction obtained in Step 17, adjust the AFC hardware with the step length STEP.

Steps 15 to 19 can be repeated. Along with a corrected frequency difference that decreases gradually, more data symbols near the training sequence midamble can be taken to obtain more frequency difference information, and the adjustment step length of the AFC hardware can be decreased gradually.

The method of the invention is a cell initial search method based on having training sequence system and can be used in a CDMA mobile communication system. A CDMA communication system using joint detection technology can use the invention, which is a method for correcting carrier deviation based on joint detection, to estimate carrier deviation. In a space wireless channel environment, the method can have a beneficial effect.

Although the invention, a downlink synchronization and carrier deviation correction method, is designed based on a TD-SCDMA system, which is proposed by CWTS (China Wireless Telecommunication Standardization) and is one of the RTT (Radio Transmission Technology) of International IMT-2000, it can also be fully used on other digital cellular mobile communication systems after an adequate update.

What is claimed is:

1. A cell initial search method for a CDMA digital mobile communication system so that user equipment correctly receives information sent by a base station, comprising:
   selecting a working frequency point by the user equipment; and
   obtaining downlink synchronization with the base station at the working frequency point by:
   (a) deciding a range of downlink training sequence timeslots by using a power characteristic window value method based on a training sequence; and
   (b) obtaining accurate receiving position for the user equipment by calculating a correlation of received data and training sequences in the range.

2. The method according to claim 1, wherein the power characteristic window value method based on a training sequence comprises:
   (a) increasing transmitting power of synchronization symbols in a downlink pilot sequence timeslot (DwPTS) of a base station data frame and making no transmitting power on protected symbols located before and after the synchronization symbols in the DwPTS; and
   (b) searching power characteristic window values of the DwPTS first by user equipment, during receiving, to discover a position range of the synchronization symbols and after having discovered the position range of the synchronization symbols, making the correlation calculation only near the position.

3. The method according to claim 2, wherein searching power characteristic window values of the DwPTS to discover a position range of the synchronization symbols comprises:
   locking in a working frequency point by the user equipment first, and receiving a data frame;
   calculating each synchronization symbol power in the DwPTS;
   calculating power characteristic window values at each synchronization symbol position;
   calculating an average power characteristic window value over the complete data frame;
   searching for a minimum value for the power characteristic window values at all synchronization symbols' position of the receiving data frame;
   comparing a ratio of average power characteristic window value to the minimum power characteristic window value to a threshold value;
   if the ratio of average power characteristic window value to the minimum power characteristic window value is greater than a threshold value, then the position of the minimum power characteristic window value becomes a beginning position for the DwPTS; and
   solving the correlation calculation near the beginning position to obtain an accurate receiving beginning point and ending downlink synchronization.

4. The method according to claim 3, wherein calculating each synchronization symbol's power comprises:
   selecting as a beginning point the beginning of a synchronization symbol as received at the receiving moment, adding powers of all chips belonging to the synchronization symbol, and getting the power of the synchronization symbol.

5. The method according to claim 3, wherein calculating power characteristic window values at each synchronization symbol position comprises:
   sliding with a symbol level on the receiving data frame, and calculating each position power characteristic window value R(i) at each position with the following formula:

$$R_i = \left( \sum_{k=i}^{i+N-1} P(k) + \sum_{k=i+N+M}^{i+2N+M-1} P(k) \right) / \sum_{k=i+N}^{i+N+M-1} P(k),$$

wherein i represents a real receiving position, P(k) represents power value of each synchronization symbol, N and M are characteristic window parameters.

6. The method according to claim 3, wherein calculating power characteristic window values at each synchronization symbol position comprises:
   sliding with a chip level based on each chip's power, and calculating the power characteristic window value at each position.

7. A cell initial search method for a CDMA digital mobile communication system so that user equipment correctly receives information sent by a base station, comprising:

tracing carrier deviation between the user equipment and the base station by the user equipment; and correcting the carrier deviation in a digital demodulator of the user equipment by:
(a) estimating the carrier deviation by software, and adjusting the digital demodulator's hardware by using a decision and feedback method; and
(b) suppressing multipath and multiple access interference and correcting the carrier deviation to a range required by baseband demodulation by using a carrier deviation correction method based on joint detection.

8. The method according to claim 7, further comprising:
estimating the carrier deviation of each data frame by software;
calculating an adjustment value for the digital demodulator's hardware; and
adjusting automatic frequency control (AFC) hardware in the digital demodulator with the calculated adjustment value.

9. The method according to claim 8, wherein the carrier deviation of each data frame is estimated by a formula comprising:

$$Ae^{-jk\alpha}\frac{1}{L}\sum_{L}[I(i)+jQ(i)]^*[I(i+K)+jQ(i+K)]^*,$$

wherein $\alpha$ represents the estimated frequency deviation, I and Q are orthogonal demodulation signals, and L is a statistic length.

10. The method according to claim 8, wherein an adjustment value for the automatic frequency control hardware is calculated by a formula comprising:

$$fa(n)=fe(n)*coef_k(n),$$

wherein fe(n) is the estimated carrier frequency deviation for the $n^{th}$ receiving data frame, the range of adjustment coefficient $coef_k$ is between 0~1, and when k is greater, select a smaller $coef_k$.

11. The method according to claim 7, wherein suppressing multipath and multiple access interference and correcting the carrier deviation to a range required by baseband demodulation by using a carrier deviation correction method based on joint detection further comprises:
inserting a training sequence midamble of data burst into each data frame for estimating real channel response;
suppressing multipath and multiple access interference with joint detection technology by the user equipment, and demodulating symbols near the training sequence midamble; and
adjusting automatic frequency control hardware with the carrier deviation information included in these symbols.

12. The method according to claim 11, wherein suppressing multipath and multiple access interference with joint detection technology and demodulating symbols near the training sequence midamble comprises:
demodulating receiving data with joint detection technology, and getting P characters before and after the training sequence midamble, and recorded as X(1) . . . X(P) and Y(1) . . . Y(P), respectively;
calculating Xi(n)=X(n)/Xj(n) , Yi(n)=Y(n)/Yj(n) , respectively, wherein Xj(n)=Yj(n)=±π/4 or ±3π/4;
getting carrier deviation direction by the formula:

$$Z=\sum_{n=1}^{P} Yi(n)/Xi(n);$$

setting an adjustment step length of automatic frequency control hardware based on the calculated carrier frequency deviation direction; and
adjusting automatic frequency control hardware with the adjustment step length according to the carrier frequency deviation direction.

13. A cell initial search method for a CDMA digital mobile communication system, comprising:
selecting a working frequency point by an user equipment and obtaining downlink synchronization with a base station at the working frequency point; and
tracing carrier deviation between the user equipment and the base station by the user equipment, and correcting the carrier deviation in a digital demodulator;
wherein obtaining downlink synchronization with a base station comprises:
(a) deciding a range of downlink training sequence timeslot first by using a power characteristic window value method based on a training sequence;
(b) obtaining an accurate receiving position of the user equipment by calculating correlation of data received and the training sequence in the range; and
(c) correcting the carrier deviation in a digital demodulator by:
(i) estimating the carrier deviation by software, and adjusting the digital demodulator's hardware by using a decision and feedback method; and
(ii) suppressing multipath and multiple access interference by using a carrier deviation correction method based on joint detection, and correcting the carrier deviation to a range required by baseband demodulation.

14. A cell initial search method for a CDMA digital mobile communication systems comprising:
searching a rough position range of DwPTS by using a power characteristic window value method and defining a working frequency point;
searching accurate receiving position by solving a correlation calculation method in the position range defined and obtaining downlink synchronization; and
recovering carrier deviation by using a carrier deviation correction method based on joint detection.

15. The method according to claim 14, wherein searching a rough position range of DwPTS by using a power characteristic window value method comprises:
locking in a working frequency point first by a user equipment and receiving a complete data frame;
calculating each symbol power P;
calculating power characteristic window values at each symbol position;
calculating average power characteristic window value;
searching for a minimum value of all power characteristic window values;
calculating a ratio of average power characteristic window value and minimum power characteristic window value; and
deciding whether the ratio is greater than a threshold value and, if it is, then the position of the minimum power characteristic window value being the starting position of DwPTS.

16. The method according to claim 15, wherein calculating each symbol power P further comprises:

assuming the receiving moment is a symbol beginning point, and then adding the power of all chips belonging to the symbol, resulting in the power of the symbol.

17. The method according to claim 14, wherein recovering carrier deviation by using a carrier deviation correction method based on joint detection comprises:

(a) setting a frame number n=0, receiving a data frame;

(b) estimating carrier frequency deviation of the data frame by software;

(c) calculating an adjustment value of carrier frequency deviation, i.e. calculating a hardware adjustment value;

(d) adjusting automatic frequency control hardware according to the calculated hardware adjustment value, incrementing the frame number n=n+1, deciding whether n is greater than a preset number of adjustment frames Q, if n is greater than Q then ending, otherwise receiving the next data frame, estimating the carrier frequency deviation of the data frame by software, and adjusting the automatic frequency control hardware according to the calculated hardware adjustment value and incrementing the frame number n=n+1 until n is greater than Q.

18. The method according to claim 17, wherein recovering carrier deviation by using a carrier deviation correction method based on joint detection further comprises the steps of:

(e) receiving m data frames;

(f) demodulating the m data frames received with joint detection technology, i.e. demodulating data symbols near a training sequence midamble and getting P symbols before and after the training sequence midamble, respectively;

(g) calculating carrier frequency deviation direction on the P symbols before and after the training sequence midamble of m data frames, respectively;

(h) setting an adjustment step length for automatic frequency control hardware, according to the calculated carrier frequency deviation direction; and (i) adjusting automatic frequency control hardware with the adjustment step length, according to the frequency carrier deviation direction obtained.

19. The method according to claim 18, further comprising repeating steps (e) to (i).

* * * * *